United States Patent

[11] 3,591,272

[72] Inventor Carter K. Reh
Santa Ana, Calif.
[21] Appl. No. 827,341
[22] Filed May 23, 1969
[45] Patented July 6, 1971
[73] Assignee Technicolor, Inc.
Hollywood, Calif.

[54] MOTION PICTURE PROJECTOR HAVING CAM APPARATUS ENABLING STOP FRAME PROJECTION
12 Claims, 12 Drawing Figs.

[52] U.S. Cl. .................................................. 352/169, 352/194
[51] Int. Cl. ...................................................... G03b 21/38, G03b 1/22
[50] Field of Search .......................................... 352/169, 194, 166

[56] References Cited
UNITED STATES PATENTS

| | | | |
|---|---|---|---|
| 3,261,654 | 7/1966 | Faber et al. | 352/169 X |
| 3,402,007 | 9/1968 | Gerlach | 352/169 X |
| 3,466,124 | 9/1969 | Geisman et al. | 352/169 |
| 3,471,227 | 10/1969 | McClellan et al. | 352/169 |
| 3,481,662 | 12/1969 | Procop | 352/194 X |

*Primary Examiner*—Louis R. Prince
*Assistant Examiner*—Joseph W. Roskos
*Attorney*—Lyon & Lyon ABSTRACT: A motion picture projector including a conventional optical system and an improved claw mechanism for moving and projecting film frames. The claw mechanism is operated in a substantially conventional manner from a motor to periodically engage perforations in the film to the advance the same. A selectively operable cam mechanism is associated with the claw mechanism to cause the claw to disengage from the film to provide stop frame projection.

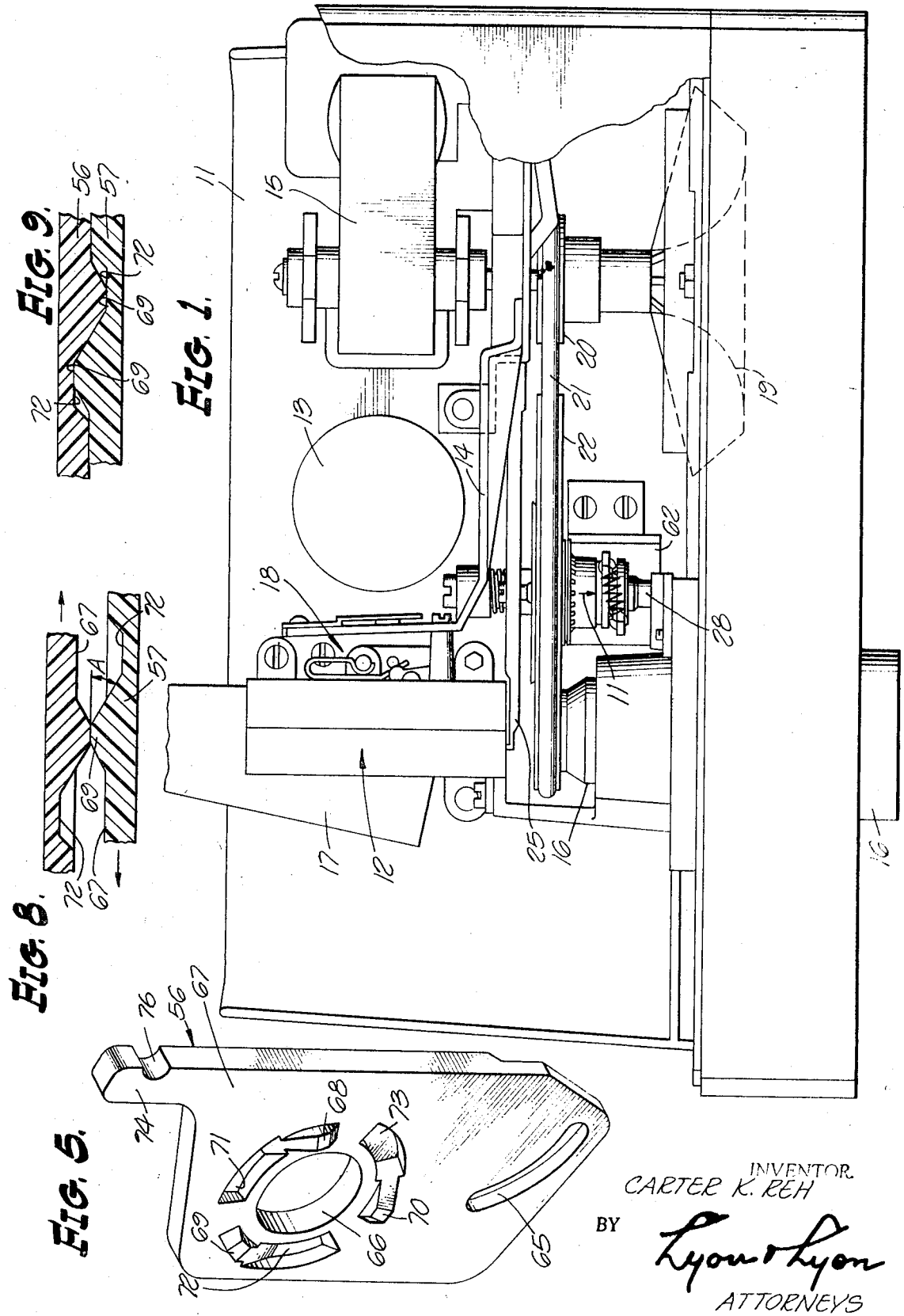

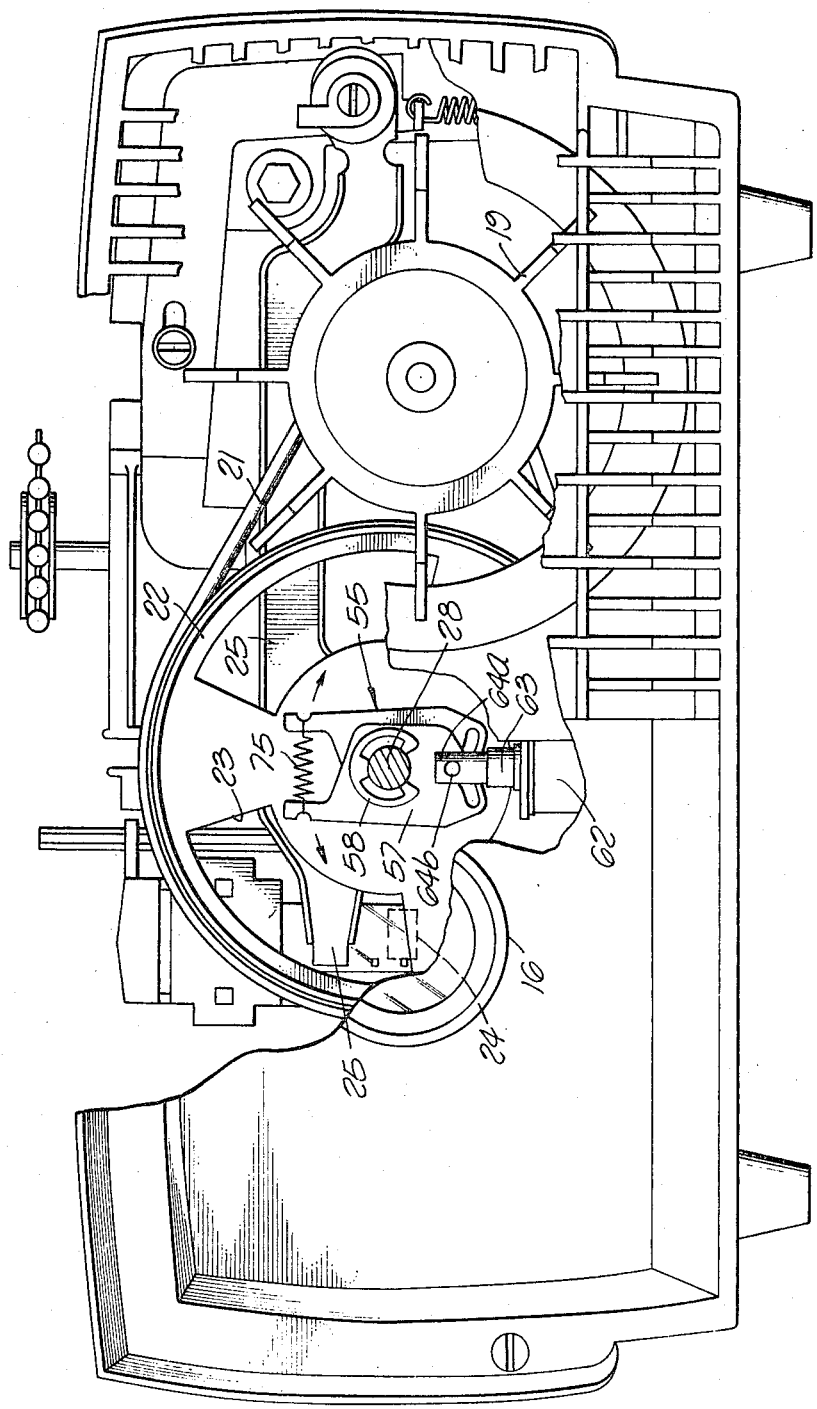

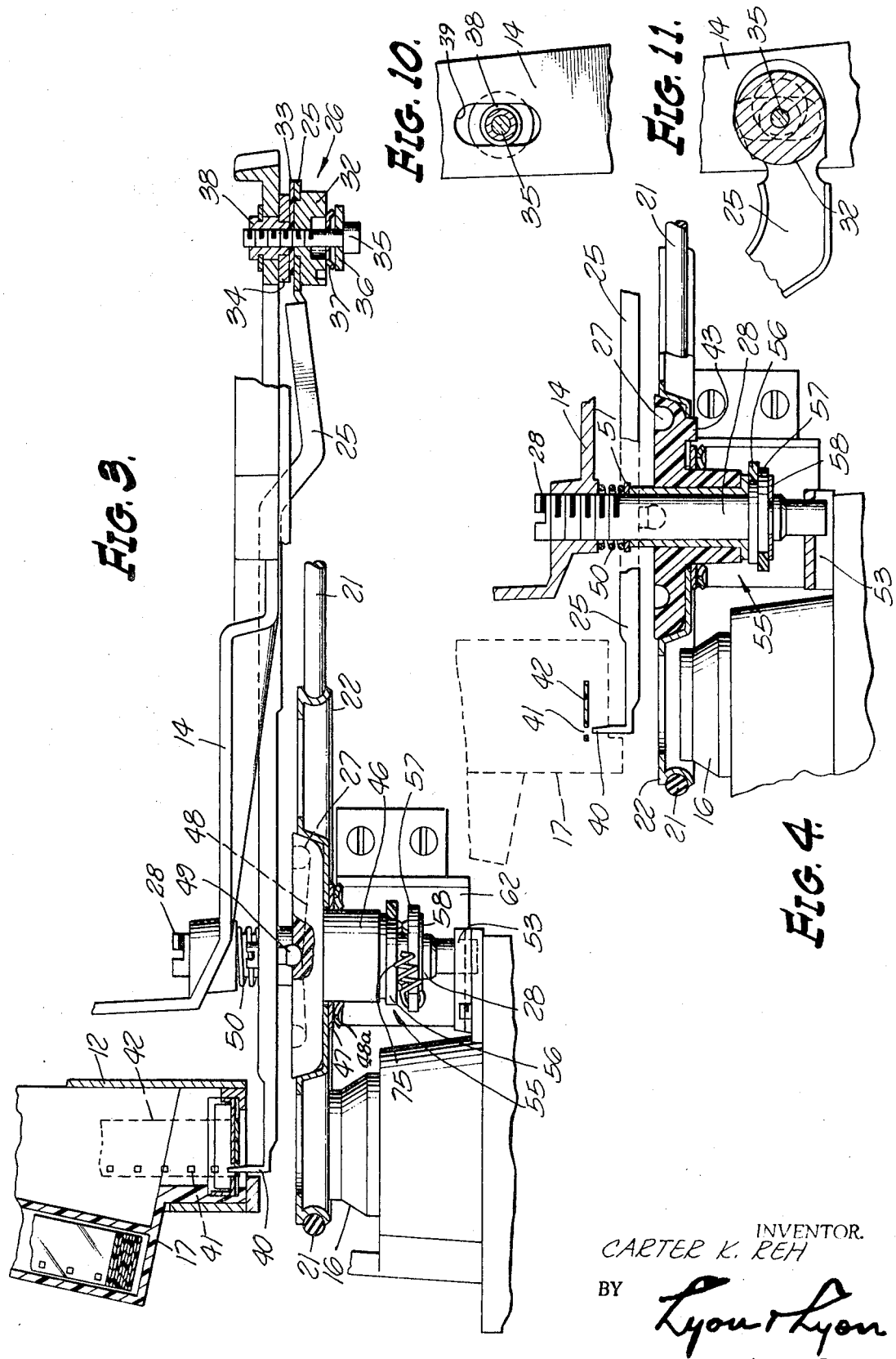

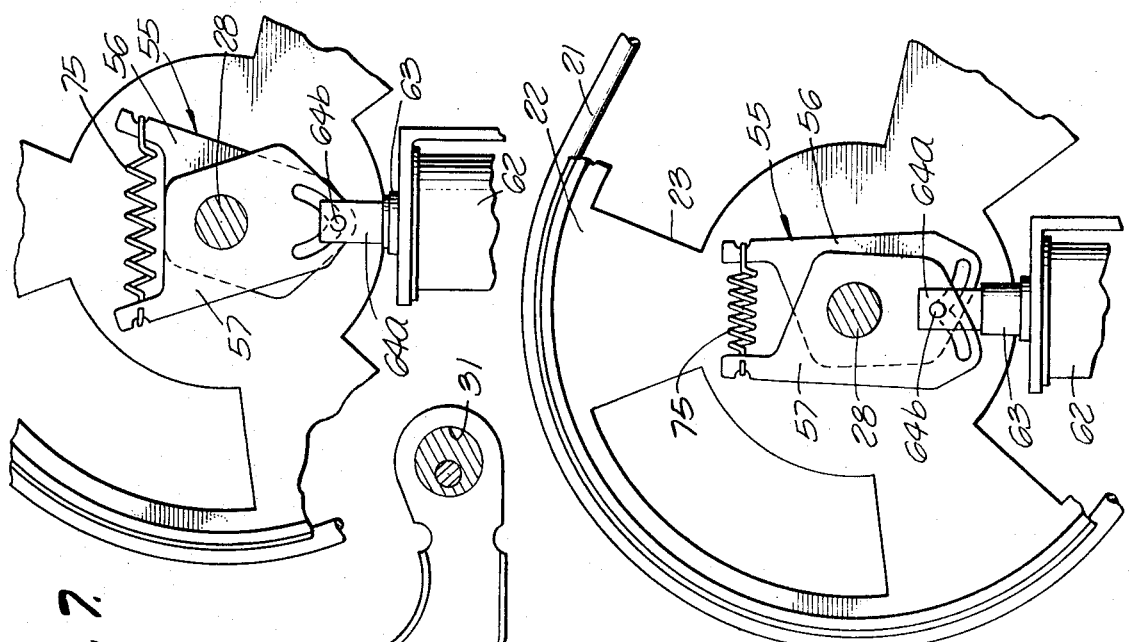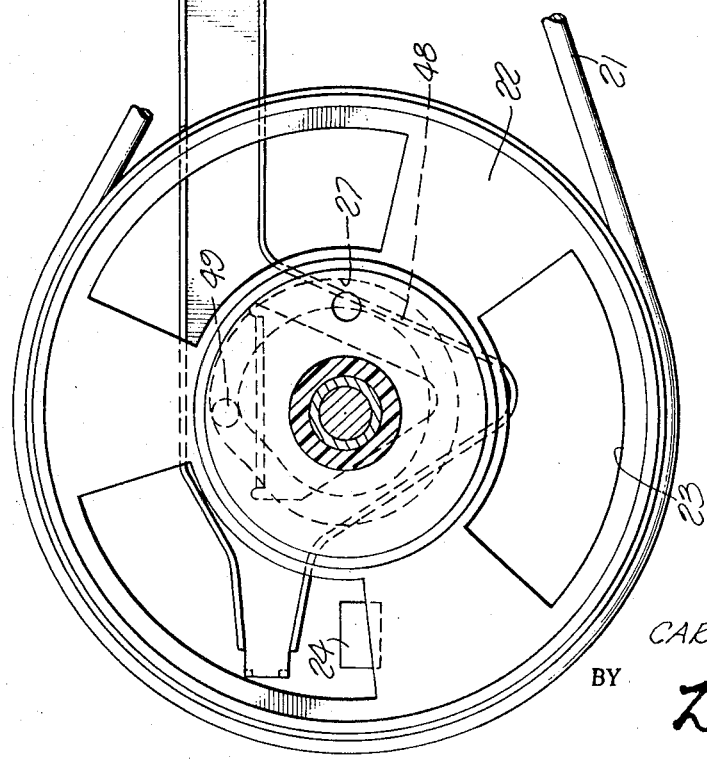

MOTION PICTURE PROJECTOR HAVING CAM APPARATUS ENABLING STOP FRAME PROJECTION

This invention relates to motion picture projectors and more particularly to a cam arrangement for selectively allowing stop frame projection.

Various types of motion picture projectors have been developed with and without the capability of projecting a single frame of film as well as conventional motion picture projection. Several arrangements for enabling stop frame projection have been devised, and typically involve braking or disengaging the mechanical driving source from the film claw mechanism. An exemplary arrangement is found in U.S. Pat. No. 3,397,937, the disclosure of which is incorporated herein by reference. This patent discloses a clutch-brake device which is operated to stop the projector shutter in an open position for stop frame projection.

A number of the arrangements for stop frame projection heretofore devised have been relatively complex and costly. Accordingly, it is a principal object of this invention to provide a relatively simple and economical arrangement for enabling stop frame projection by a motion picture projector.

It is another object of this invention to provide a novel cam device for selectively disengaging a film advance mechanism from the film in a motion picture projector.

It is a further object of this invention to provide a cam device for the claw advance mechanism of a motion picture projector, the cam device being selectively operable for causing the claw to engage or to disengage the film.

These and other objects and features of this invention will become better understood through a consideration of the following description taken in conjunction with the drawings in which:

FIG. 1 is a top cutaway view of a projector incorporating the novel cam mechanism according to the present invention for enabling stop frame projection;

FIG. 2 is a front cutaway view of the projector of FIG. 1;

FIG. 3 is a detailed top view of the claw advance and cam mechanisms of the projector;

FIG. 4 is a partial view similar to that of FIG. 3 illustrating the advance and cam mechanisms positioned for stop frame projection;

FIG. 5 is a perspective view of one cam element of the present cam mechanism;

FIG. 6 is a front view of the cam mechanism and projector shutter illustrating the cam mechanism as film is being engaged by the claw for normal projection;

FIG. 7 is a view similar to FIG. 6 but illustrates the cam mechanism as the claw is disengaged from the film for stop frame projection;

FIGS. 8 and 9 are cross-sectional views of the cam elements respectively positioned for normal and stop frame projection;

FIGS. 10 and 11 are front fragmentary views illustrating mounting of the pivoting end of the claw arm; and FIG. 12 is a front view of the claw and shutter mechanism.

Turning now to the drawings, FIGS. 1 and 2 generally illustrate a cartridge-loading movie projector 10 incorporating the concepts of the present invention. Except for the particular modified portions of this projector relating to the cam mechanism for selectively allowing stop frame projection, this projector is similar to that disclosed in U.S. Pat. Nos. 3,139,789 and 3,397,937. However, it will be readily appreciated by those skilled in the art that the present inventive concepts are equally applicable and adaptable to other forms of motion picture projectors by appropriately adapting the elements to the corresponding components of such other projectors.

The projector 10 includes a base or frame 11 on which is mounted a cartridge socket assembly 12, a projection lamp 13 having an internal reflector, a partition wall 14, a motor 15, and a projection lens 16. A film cartridge 17 removably fits in the socket assembly 12 and a light-reflecting assembly, generally denoted by numeral 18 and more fully described in said above patents, is adapted to reflect light from the lamp 13 through the film and out through the projection lens 16. The cartridge 17 may be of the nature described and illustrated in U.S. Pat. No. 3,244,471.

The motor 15 has a shaft which extends forward through the partition wall 14 for driving a fan 19 which serves to cool the motor 15 and lamp 13, and for driving a pulley 20 and belt 21. The belt 21 engages the periphery of, and serves to continuously rotate, a circular shutter 22 which has three spaced circumferential apertures 23 as best seen in FIGS. 2 and 12. These apertures 23 serve to interrupt the image projected from a projection aperture 24 (FIG. 2) three times during each revolution of the shutter 22 to minimize the perceptibility of the flicker in advancing the film a single frame for each revolution of the shutter 22.

The film advance mechanism includes a claw arm 25 (note FIGS. 1—3 and 12) which is pivotally mounted on a pivot assembly 26 at the right end of the frame 14 as seen in FIG. 3. The arm 25 is driven by a cam 27 secured to the shutter 22 as is explained in more detail subsequently. Both the shutter 22 and cam 27 are mounted for rotation on a fixed shaft 28. The film is advanced a single frame per revolution of the shutter 22 and such advancement occurs between two of the apertures 23 so that the film, while being advanced, is not projected onto a projection screen.

Turning now to more detailed consideration of the film advance mechanism, the claw arm 25 is mounted on the frame 14 by the pivot assembly 26 as best seen in FIGS. 3, 10 and 11. The right end of the claw arm has a hole 31 to which is coupled an eccentric member 32, a flat washer 33, and a spacer 34. This assembly is secured to the right end of the partition 14 by means of a machine screw 35, a clamp 36, a lockwasher 37 and an internally threaded collar 38. The collar 38 is mounted in a slot 39 in the partition 14 to allow the pivot assembly 26 to be adjusted up or down, and the eccentric 32 allows the arm 25 to be adjusted slightly to the left or right as viewed in FIG. 3. These two adjustments allow proper positioning of the claw fingers 40 of the claw arm 25 with respect to perforations 41 in the film 42.

The cam 27 is keyed at 43 to the shutter 22 such that the two are maintained properly positioned with respect to each other. The cam includes a collar portion 46 which extends through a hole 47 in the shutter 22, and the cam is secured to the shutter by means of a clip fastener 48. This assembly is mounted for rotation on the shaft 28 which in turn is threadably secured at 47 to the partition 14. The cam 27 has a cam face or surface 48 which is engaged by a cam follower 49 secured to the claw arm 25 as best seen in FIG. 3. As the cam 27 and shutter 22 rotate, the claw arm thus is caused to move into engagement with the film, advance the film one frame, and then disengage the film, this action being repeated continuously in the normal motion picture projection mode of operation. A spring 50 and washer 51 are mounted on the shaft 28 between the partition 14 and the claw arm 25 as best seen in FIGS. 3 and 4 to bias the cam follower 49 toward the cam surface 48 of the cam 27. The forward end of the shaft 28 is secured to a bracket 53.

According to the principal concepts of the present invention, a cam mechanism 55 is provided for selectively allowing stop frame projection. This cam mechanism comprises a pair of identical cam elements 56 and 57, one of which is shown in detail in FIG. 5, loosely mounted on the shaft 28. This cam mechanism serves to normally maintain the cam 27 and shutter 22 in the upper or rear position as shown in FIG. 3 whereby the claw fingers 40 of the claw arm 25 can periodically move into and out of engagement with the film 42 for normal continuous advance of the film. Rotation of the cams 56 and 57 with respect to each other by pulling the same downwardly as illustrated in FIG. 7 causes the two cam elements 56 and 57 to move together as seen in FIG. 4 thereby allowing the cam 27 (and collar 46 thereof), shutter 22 and claw arm 25 to shift toward the front of the projector as viewed in FIGS. 1 and 3 thereby preventing the claw fingers 40 from engaging the film 42 even though the claw arm continues to move with its usual oscillatory motion. Movement of the advance mechanism as just described is caused by the force of the spring 50. Return of the cam elements 56 and 57 to the position shown in FIGS. 3 and 6 allows the cam 27, shutter 22 and claw arm 25 to return to the position shown in FIG. 3, thereby returning the mechanism to a normal continuous advance mode.

The cam elements are retained on the shaft 28 by a clip 58, and the outer smooth surface of the cam element 56 bears on a bushing surface 59 of the collar 46 of the cam 27. Rotation of the cam elements 56 and 57 is accomplished by means of a solenoid 62 which has a movable plunger 63. The upper end of the plunger 63 is coupled to the cam elements 56 and 57 by a U-shaped bracket 64a and a cotter pin 64b which extends through an arcuate slot 65 (FIGS. 5—7) in both cam elements 56 and 57.

As noted earlier, both of the cam elements 56 and 57 are identical, and only one of the elements is illustrated in FIG. 5 and explained in detail below. This cam element is made of any suitable material, such as an acetal resin sold under the trade name Delrin, and includes a central aperture 66 which is slightly larger than the shaft 28. Each cam element has a flat inner surface 67 with three cam protrusions 68 through 70 and three cam depressions 71 through 73. It will be apparent when considering the drawings that when the cam elements 56 and 57 are disposed with the inner surfaces facing each other as illustrated in FIGS. 3, 6 and 8, the cam surfaces 68 through 70 of both elements face and abut each other thereby separating the inner surfaces of the cam elements 56 and 57. The angle A at the interface between cam protrusions and depressions as seen in FIG. 8 may be approximately 30 degrees. The face of the protrusions 68 through 70 extends above, and the base of the depressions 71 through 73 extends below, the surface 67 by approximately 0.030 inch. The arcuate slot 65 has a radius of approximately 0.312 inch. Each cam element has a projection 74 and groove 75 forming a hook. The ends of a spring 76 engage the hooks of the cam elements, and the spring 75 normally maintains the cam elements in the position shown in FIGS. 3, 6 and 8. Thus, the cam elements normally rest on the high faces 68 through 70 thereof under force of the spring 75.

When the solenoid 62 is energized, the plunger 63 is lowered thereby causing the cam elements 56 and 57 to rotate on the shaft 28 with respect to each other to the position seen in FIGS. 4, 7 and 9. This causes the cam surfaces 68 through 70 of one element to mate with the depressions 71 through 73 of the other element as best seen in FIG. 9 thereby allowing the inner surfaces 67 of the elements to move together as seen in FIGS. 4 and 9. This allows the cam 27 and collar 46 thereof, shutter 22 and claw arm 25 to move forward under the force of the spring 50 to the position illustrated in FIG. 4 as previously explained.

It will be apparent that the solenoid 62 may be operated by any suitable switch arrangement so as to enable stop frame projection when desired. A single frame is projected as long as the solenoid is energized since the film is not periodically engaged by the claw fingers 40. Although it is possible to energize the solenoid 62 before a film frame has been pulled all the way down by the claw fingers 40 and, thus, before the frame is properly positioned in the projection aperture 24, the chances of this occurring are relatively remote inasmuch as the film advance occurs during only approximately one-tenth of the revolution of the film advance cam 27. Even if the film frame is not properly positioned, it is merely necessary to deenergize and reenergize the solenoid which can be accomplished very quickly, until a frame is properly positioned at the aperture 24. Although a solenoid 62 is described and illustrated for operating the cam mechanism 55, it will be appreciated that the same may be operated manually if desired.

The present embodiment of this invention is to be considered in all respects as illustrative and not restrictive.

What I claim is:

1. In a motion picture projector which includes a film advance mechanism for periodically advancing film for normal continuous projection thereof, said film advance mechanism including a first cam assembly means which moves a claw arm which periodically engages and disengages the film for advancement thereof frame by frame, the improvement comprising means for selectively disengaging said film advance mechanism from the film to allow an individual frame of said film to stop and be projected, comprising selectively operable second cam assembly means for normally maintaining said advance mechanism in a first position in which it periodically engages and disengages said film and for moving said advance mechanism to a second position in which it is disengaged from the film, said second cam assembly means including a pair of cam elements which normally remain in a given relationship with respect to one another and which move relative to one another to allow said advance mechanism to move to said second position, and selectively operable means coupled with said cam means for moving one of said cam elements relative to another.

2. An apparatus as in claim 1 wherein said selectively operable means comprises a solenoid device coupled with said cam elements for selectively rotating said cam elements with respect to one another.

3. A motion picture projector selectively operable for stop frame projection comprising an advance mechanism for advancing film through an optical system of said projector for normal projection of said film frame by frame, said advance mechanism including claw arm means moved by a cam follower riding on a rotating cam face causing said claw arm to periodically engage, move and disengage said film, means for selectively disengaging said claw arm means from the film for enabling a single frame of film to be projected, comprising cam means normally maintaining said rotating cam face in a first position in which it permits said claw arm means to periodically advance said film and for moving said rotating cam face in the direction of its axis to a second position in which it moves said claw arm means away from said film whereby said claw arm means is continually disengaged from said film, and selectively operable means coupled with said cam means for selectively causing said cam means to move said rotating cam face axially to said second position.

4. A projector as in claim 3 wherein said cam means includes a pair of cam elements normally maintained in a first spaced relationship, and which are movable relative to one another to move to a second spaced relationship for respectively allowing said advance mechanism to be positioned in said first and second positions thereof.

5. A projector as in claim 6 wherein said claw arm means and rotating cam face are mounted on a shaft, and a resilient member normally biasing said claw arm means and cam follower away from said film, and said cam means normally biasing said claw arm means and cam towards said film, said cam means comprising a pair of cam elements normally maintained in a first spaced relationship for normally biasing said claw arm means and cam follower towards said film, said cam elements being movable relative to one another to move to a second spaced relationship for allowing said claw arm means, rotating cam face and cam follower to be moved away from said film by said resilient member.

6. A cam mechanism for use with a film advance mechanism of a motion picture projector for allowing selective stop frame projection of motion picture film by causing said film advance mechanism to move out of engagement with said film, comprising a pair of similar cam elements each having a side with a cam surface having high and low points on said cam surface, said cam elements being mounted together with said cam surfaces adjacent one another, and means coupled with said cam elements for normally maintaining said cam elements in a position with the high points of said cam surfaces abutting one another, and for allowing said cam elements to be relatively moved to cause the high points of one cam surface to abut the low points of the other cam surface to enable said sides of said elements to move together.

7. In a motion picture projector which includes a film advance mechanism for periodically advancing film for normal continuous projection thereof, said film advance mechanism including means which periodically engages and disengages the film for advancement thereof frame by frame, the improvement comprising means for selectively disengaging said film advance mechanism from the film to allow an individual frame of said film to stop and be projected, comprising selectively operable cam means for normally maintaining said advance mechanism in a first position in which it periodically engages and disengages said film and for moving said advance mechanism to a second position in which it is disengaged from the film, said cam means comprising a pair of substantially identical cam elements each having a side face with cam faces thereon, said cam faces of said elements normally engaging each other to maintain said advance mechanism in said first position, and said cam elements being movable relative to each other to move the cam faces of one element with respect to the cam faces of the other element to thereby cause said cam elements to move toward one another to allow said advance mechanism to move to said second position, and selectively operable means coupled with said cam means for moving one of said cam elements relative to the other.

8. An apparatus as in claim 7 wherein said selectively operable means comprises a solenoid device coupled with said cam elements for selectively rotating said cam elements with respect to one another.

9. In a motion picture projector which includes a film advance mechanism for periodically advancing film for normal continuous projection thereof, said film advance mechanism including means which periodically engages and disengages the film for advancement thereof frame by frame, the improvement comprising means for selectively disengaging said film advance mechanism from the film to allow the individual frame of said film to stop and be projected, comprising selectively cam means for normally maintaining said advance mechanism in a first position in which it periodically engages and disengages said film and for moving said advance mechanism to a second position in which it is disengaged from the film, said cam means including a pair of cam elements each of said cam elements having a side with a cam surface having high and low points on said cam surface, the cam elements being mounted together with said cam surfaces adjacent one another with said high points normally engaging each other to maintain said advance mechanism in said first position and said cam elements being movable relative to each other to move the high points of one element into engagement with the low points of the other element to thereby cause said cam elements to move together to allow said advance mechanism to move to said second position, and selectively operable means coupled with said cam means for moving one of said cam elements relative to another.

10. A motion picture projector selectively operable for stop frame projection comprising an advance mechanism for advancing film through an optical system of said projector for normal projection of said film frame by frame, said advance mechanism including means causing the same to periodically engage, move and disengage said film, means for selectively disengaging said film advance mechanism from the film for enabling a single frame of film to be projected, comprising cam means normally maintaining said advance mechanism in a first position in which it periodically advances said film and for moving said advance mechanism to a second position in which it is continually disengaged from said film, said cam means comprising a pair of substantially identical cam elements each having a side with a cam surface thereon, said cam elements being mounted together with said sides adjacent one another and said cam surfaces engaging one another, said cam elements being normally maintained in a given spaced-apart relationship, and selectively operable means coupled with said cam elements causing said cam elements to move together upon operation thereof to move said advance mechanism to said second position.

11. A motion picture projector selectively operable for stop frame projection comprising:

an advance mechanism for advancing film through an optical system of said projector for normal projection of said film frame by frame, said advance mechanism including a claw arm for advancing said film and a cam for moving said claw arm causing said advance mechanism to periodically engage, move and disengage said film, said claw arm and cam being mounted on a shaft, and a resilient member normally biasing said claw arm and cam away from said film said claw arm and said cam being mounted on said shaft intermediate said resilient member and said cam elements said cam means normally biasing said claw arm and cam toward said film, said cam means comprising a pair of cam elements, each of said cam elements having a side with a cam surface thereon, said cam elements being mounted together with said sides adjacent one another and said cam surfaces engaging one another, said cam elements being rotatable with respect to one another to allow said sides to move together upon selective operation thereof to move said cam elements to a second spaced relationship for allowing said claw arm and cam to be moved away from said film by said resilient member, and selectively operable means coupled with said cam means for selectively causing said cam means to move said advance mechanism to said second spaced relationship.

12. In a motion picture projector which includes a film advance mechanism for periodically advancing film for normal continuous projection thereof, said film advance mechanism including claw arm means moved in an oscillatory motion to periodically move said claw arm into engagement with a film strip, advance said film strip one frame and then disengage said film strip, the improvement comprising disengaging means for moving said claw arm away from said film strip while continuing said oscillatory motion of said claw arm whereby said claw arm is continually disengaged from said film, and means for selectively controlling said disengaging means.